United States Patent [19]
Mayfield

[11] 3,926,063
[45] Dec. 16, 1975

[54] FLOATING IDLER PULLEY APPARATUS

[76] Inventor: Leonard E. Mayfield, B-7 Rocket Mobile Village, Alamogordo, N. Mex. 88310

[22] Filed: Dec. 9, 1974

[21] Appl. No.: 530,546

[52] U.S. Cl. ...... 74/242.11 A; 74/227; 74/242.11 L; 74/242.14 R
[51] Int. Cl.[2] ..... F16H 7/12; F16H 7/00; F16H 7/10
[58] Field of Search ............ 74/226, 227, 242.11 A, 74/242.11 L, 242.14 R

[56] References Cited
UNITED STATES PATENTS

| | | | |
|---|---|---|---|
| 716,520 | 12/1902 | Cole | 74/226 X |
| 3,575,058 | 4/1971 | Kraus | 74/227 |
| 3,630,096 | 12/1971 | Brewer | 74/242.11 A X |

Primary Examiner—Leonard H. Gerin
Attorney, Agent, or Firm—Robert W. Weig

[57] ABSTRACT

The disclosure relates to a floating idler pulley apparatus comprising a housing, a central pulley or wheel, and two adjustable tensioner pulleys or wheels. The axes of rotation of the central pulley and the tensioners are parallel to one another and disposed perpendicular to and along a tiltable axis. The apparatus is mountable on a belt or chain band and is adjustable when the band is stationary or moving, to set the pressure or tension of the band on driving and driven pulleys as well as increase the area of contact between the band and such pulleys.

9 Claims, 4 Drawing Figures

FLOATING IDLER PULLEY APPARATUS

FIELD OF THE INVENTION

The invention relates to idler pulleys and more particularly to floating adjustable tensioner idler pulleys.

BACKGROUND OF THE INVENTION

There has been a long-existing need for a belt and chain band tightener or tensioner which can be adjusted when the band upon which it rides is moving. Clearly, there has also been a long existing need for a belt and chain tensioner which is self-adjusting so as to compensate for the gradual stretching of a band.

Bands, which can comprise any flexible material or a chain, such as fan belts, bicycle chains, blower belts, pump drive belts, and countless others, frequently stretch somewhat with use. Consequently, the structure supporting the driving and driven pulleys for such bands must from time to time be adjusted so that band tension remains within a predetermined operable range. In some applications, this adjustment requirement asserts itself almost constantly, so that constant readjustment of the band is a real nuisance.

For example, in driving an abrasive tool such as a dental drill or a grinding wheel, a specific speed in surface feet per minute (SFM) must be maintained to provide a tool "dressing" minimizing tool wear. If the belt driving such a tool slips, the tool rotates at a lower speed and extensive tool wear occurs.

In addition, in many applications, such as in pumping oil from wells with motors in the 600 horsepower range to the tiniest of hobby motors, because of loss of maximum tension and/or insufficient band-to-pulley contact, band slippage occurs which results in inefficient rotational energy transfer between a driving pulley and a driven pulley.

Many prior art devices exemplify attempts to solve these problems. One such attempt is that proffered by U.S. Pat. No. 2,897,683 to R. H. Carver. As can best be seen in FIGS. 2 and 4 thereof, a belt tightener 10 comprises two idler rollers 48 secured to a stabilizer arm 66 bolted to a supporting structure which also supports a driving pulley 60 and a driven pulley 62. The tension on a belt 58 driven about pulleys 60 and 62 is adjusted by a threaded member 28 which sets the distance between idler rollers 48. As can be seen, the belt tightener disclosed in this patent cannot float on belt 58 because it is secured to stabilizer 66 which is bolted to a supporting structure. Thus, as belt 58 gradually stretches with time, the distance between rollers 58 must be manually adjusted to maintain suitable tension on belt 58. The tensioner of this patent therefore is not self-adjusting. Because it fails to maintain a constant tension on belt 58, it must be periodically manually incrementally tightened. A similarly secured band tightener is shown in U.S. Pat. No. 3,602,054 to Donald A. Monteith, et al. The Monteith patent illustrates sprocketed pulleys for tensioning chain drives rather than the grooved pulleys of Carver which are adapted to belt tightening.

Another prior art device is taught by U.S. Pat. No. 3,574,287 to Heidacker. The device shown therein relates to an idler tensioner suitable only for chains and for toothed belts. An idler pulley having a relatively large diameter is disposed between two smaller diameter driving and driven pulleys and engaged with the toothed belt. To adjust the tension of the belt, it must be pulled away from the idler pulley and the idler pulley advanced toward either the driving or the driven pulley, after which the belt is released, and its teeth necessarily enmeshed with the teeth of the belt. With this device, belt tension adjustment is a trial and error problem in which the large central pulley may have to be repeatedly moved until a satisfactory tension is achieved. Clearly, the belt must be stopped, and therefore whatever machinery is being operated thereby must be stopped to adjust belt tension. In addition, the device is limited to use on toothed belts and chains. This device also fails to be self-adjusting in that it must be manually adjusted with the belt stopped whenever a sufficient belt stretching occurs.

U.S. Pat. No. 3,630,096 to Brewer shows a device for tensioning chain or belt bands which reverse direction. This device is partially "floating" in that two idler tensioning sprockets or pulleys 21 and 22 are adjustably spaced on an arm 20 which may slide through a guide bracket 10 when the direction of drive of the band which the device tensions changes. However, guide 10 is fixed onto a support and the arm 20 may experience only one direction of travel, essentially perpendicular to that of the band, so that the device cannot move or tilt so as to be continuously self-adjusting tension as the band stretches by tiltably moving toward or away from either the driving or driven pulley.

It is evident that a problem exists in that the prior art fails to provide a self-adjusting, entirely free floating chain or belt band tensioner.

One object of the present invention is to provide continuous tension on a gradually stretching chain or belt band.

Another object of the present invention is to provide a self-adjusting tensioner.

Still another object of the present invention is to provide a floating idler tensioner adjustable while the belt on which it floats moves.

Yet another object of the invention is to provide an idler dependent only on the band which it tensions for support.

One advantage of the present invention is that in accordance therewith, a moving belt can be continuously kept at a preselected tension, even as it stretches, without manual adjustments and without stopping the belt.

Another advantage of the instant invention is that its use provides greater areas of band to pulley contact, i.e., purchase area, on both driving and driven pulleys, thereby increasing energy transmission efficiency and band life.

Still another advantage of the instant invention is that the floating idler thereof can be set to release the belt from driving the driven pulley if the driven pulley offers sufficient turning resistance to damage the belt or other part of the system.

SUMMARY OF THE INVENTION

In accordance with the instant invention, there is provided an idler tensioner apparatus floatable on a drivable chain or belt band having a driving portion and a driven portion, the band engaging at least one driving pulley and one driven pulley. The floating idler tensioner of the invention comprises a housing having a longitudinal axis through which a central rotatable pulley or sprocket is rotatably attached to the housing. The axis of rotation of the central pulley is perpendicular to and passes through the longitudinal axis of the housing.

First and second tension imposing rotatable wheels, pulleys or sprockets are also disposed along the longitudinal axis with their axes of rotation perpendicular to the longitudinal axis and parallel to the axis of rotation of the central pulley. The first and second tension imposing pulleys frictionally engage the band and press it into frictional engagement with the central pulley. The apparatus is adjustable as it floats on the band and applies tension to the band. Because of the pinch effect of the two tensioner pulleys on the band, it increases purchase area by frictionally engaging the driving and driven pulleys on a greater portion of their circumferences to increase energy transmission efficiency from the driving to the driven pulley.

BRIEF DESCRIPTION OF THE DRAWINGS

Other objects and advantages of the instant invention will be apparent to those skilled in the art from the following description and appended drawings wherein like numbers denote like parts, and wherein.

DETAILED DESCRIPTION OF THE PREFERRED EMBODIMENTS

As used herein, the term "band" comprises any belt or chain usable for transferring rotational energy from a driving pulley, wheel or sprocket to a driven pulley, wheel or sprocket. "Bands" include, but are not limited to, automotive fan, alternator, and water pump drive belts, bicycle and motorcycle chains, oil well pumping belts, cables, ropes, strings, cords and similarly used flexible lengths of material.

As used herein, a "pulley" is a sheave or wheel with a grooved or ungrooved rim. The groove in the rim is preferably of a cut to accommodate a belt having a particular cross-section. For example, "V-grooved" pulleys are for use with "V" belts. The belts or bands used with the apparatus of the invention may be smooth or toothed. With toothed belts and chains, a sprocket rather than a wheel type pulley may be used.

Figure 1:
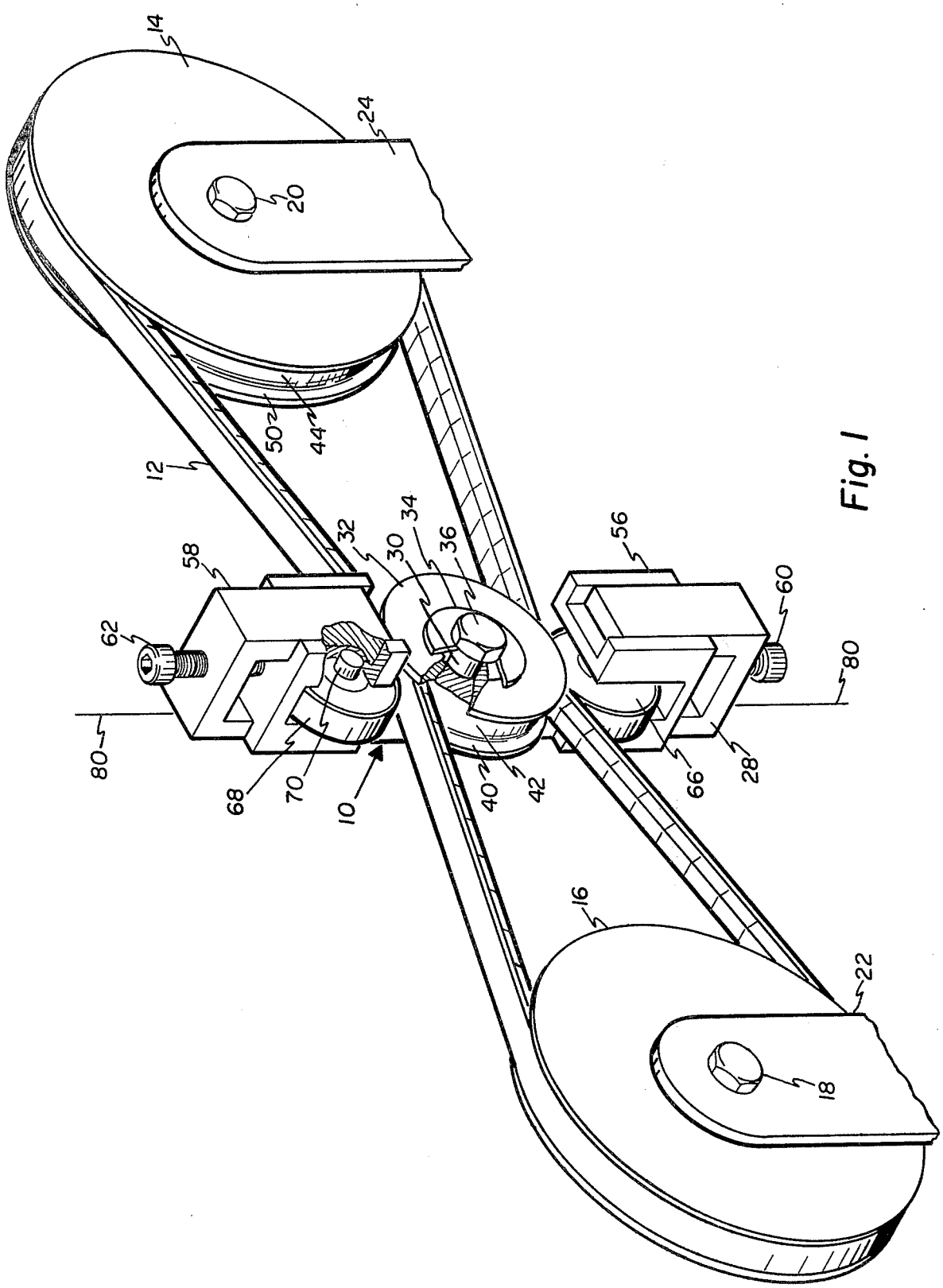
FIG. 1 illustrates apparatus in accordance with the invention in use on a belt.

Reference is now made to FIG. 1 which illustrates a preferred embodiment of the invention. A floating idler band tensioner 10 in accordance with the invention floats on a belt 12 operably engaged between two pulleys 14 and 16. As illustrated, the pulleys 14 and 16 and belt 12 are all stationary; either pulley 14 or 16 can be a drive pulley and the other a driven pulley. Pulleys 14 and 16 turn on axles 18 and 20 which rotatably engage stands 22 and 24. Pulleys 14 and 16 on axles 18 and 20 and stands 22 and 24 constitute no part of this invention but serve to show its use in a simple application.

Tensioner 10 comprises a housing 28 at the approximate center of which is disposed an axle 30 on which is mounted pulley 32 by means such as a washer 34 and bolt 36. Preferably, pulley 32 contains a high quality bearing, not shown for the sake of clarity, on which it may freely spin or turn on axle 30. Pulley 32 also preferably has a groove 40 and groove walls 42 similar to grooves 44 and groove walls 50 in pulleys 14 and 16. Such grooves provide good belt to pulley fit.

Also disposed on housing 28 are slidable blocks 56 and 58 which slidably engage housing 28 so that they may be moved toward and away from central pulley 32. Slidable blocks 56 and 58 are preferably provided with set screws 60 and 62 so that their distance from central pulley 36 can be manually adjusted. It will be appreciated by those skilled in the art that equivalent retaining means such as clamps, bolts through holes, ratchets, etc., can also be used. Rotatably mounted in blocks 56 and 58 on axles 70 are tensioning pulleys 66 and 68. For the sake of clarity only one slidable block and tensioner pulley are cut away to show axle 70. Tensioner pulleys 66 and 68 also preferably contain high quality bearings for relatively frictionless spinning at low, medium and high rpms. The axes of rotation of the pulleys 32, 66 and 68 are parallel to one another as well as perpendicular to and running through a longitudinal axis 80.

Figure 2:
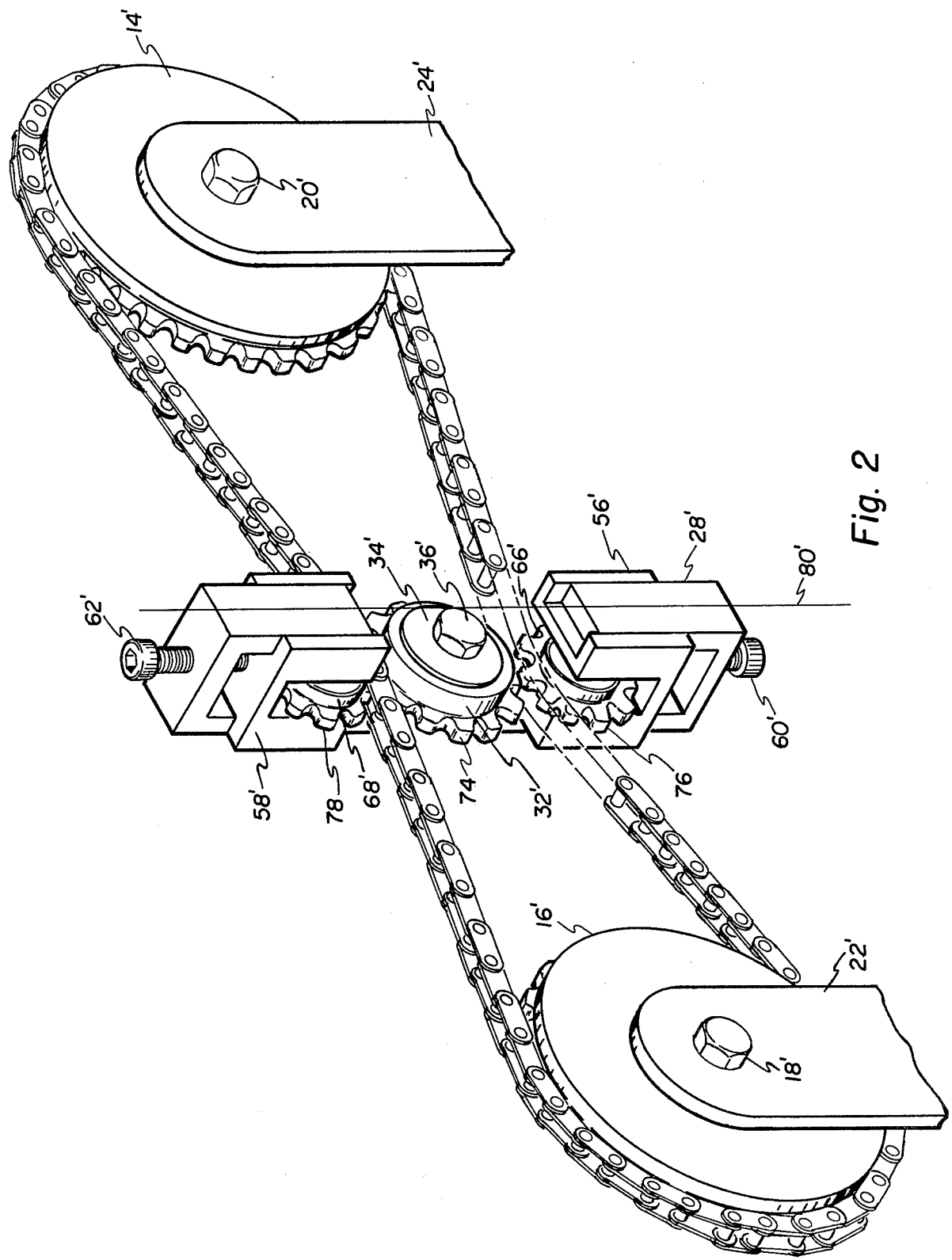
FIG. 2 shows apparatus in accordance with the invention in use with a chain.

FIG. 2 illustrates an embodiment of apparatus in accordance with the invention particularly adapted for use with a chain. The elements therein denoted by primed numbers perform similar functions to those denoted by unprimed numbers in FIG. 1. It should particularly be noted that sprockets 74, 76 and 78 on sprocket wheels 32', 66' and 68' are sufficiently truncated to allow the chain to pass therepast with the teeth of those pulleys opposing one another. See how the teeth 76 of sprocket wheel 66' engage the teeth 74 of wheel 32' where they meet, but do not mesh. The axes of rotation of all three pulleys of the floating roller tensioner lie perpendicular to and along a single longitudinal axis 80' passing through the housing 28'.

In embodiments of the invention for use with a chain, tensioner pulley wheels rather than sprocketed wheels may also be used. The tensioner of the invention when used with a chain, serves to maintain the teeth of the driving and driven sprockets in firm contact with the chain so that they do not allow the chain to slip a tooth or cog, or worse, half of a cog, which generally proves disasterous. Any chain "flop" can wreck a tool, or any other part of an assembly incorporating the chain to drive it.

Figure 3:
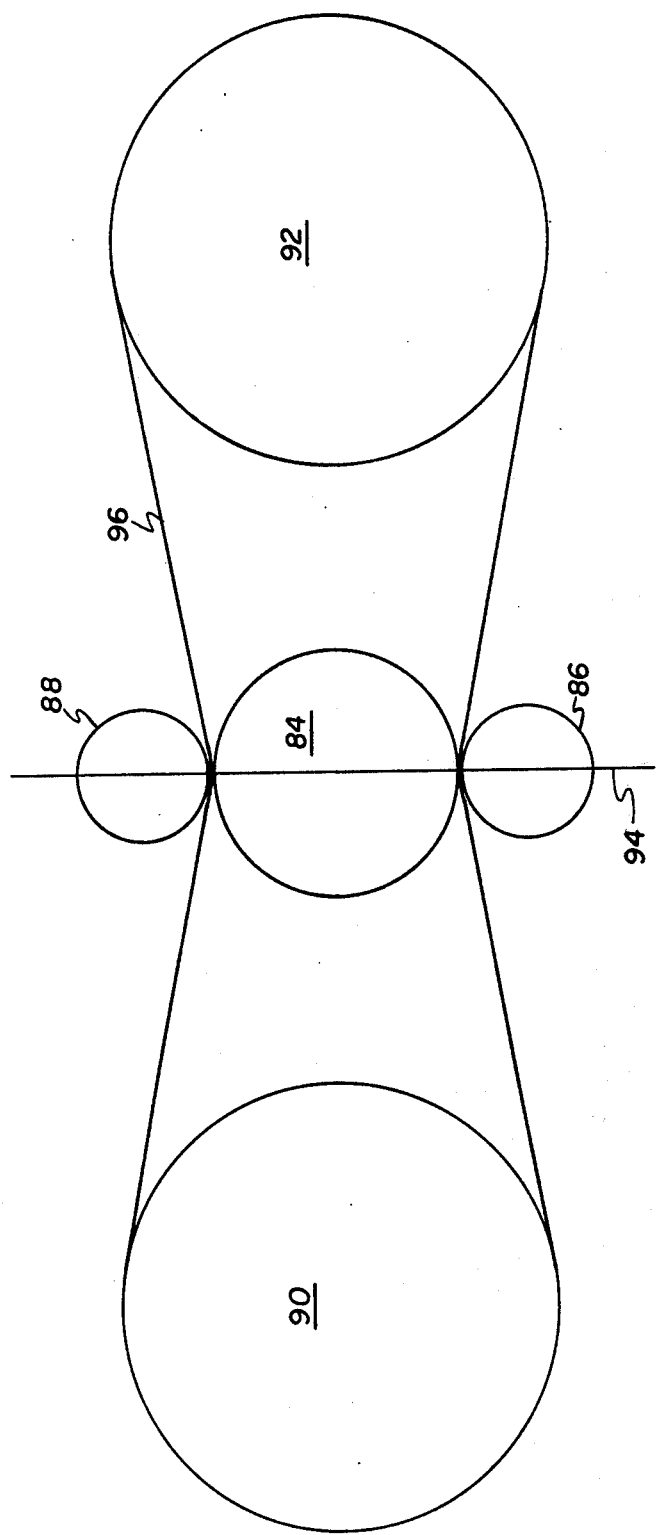
FIG. 3 schematically shows the tensioner of the invention on a non-moving or moving unloaded belt.
Figure 4:
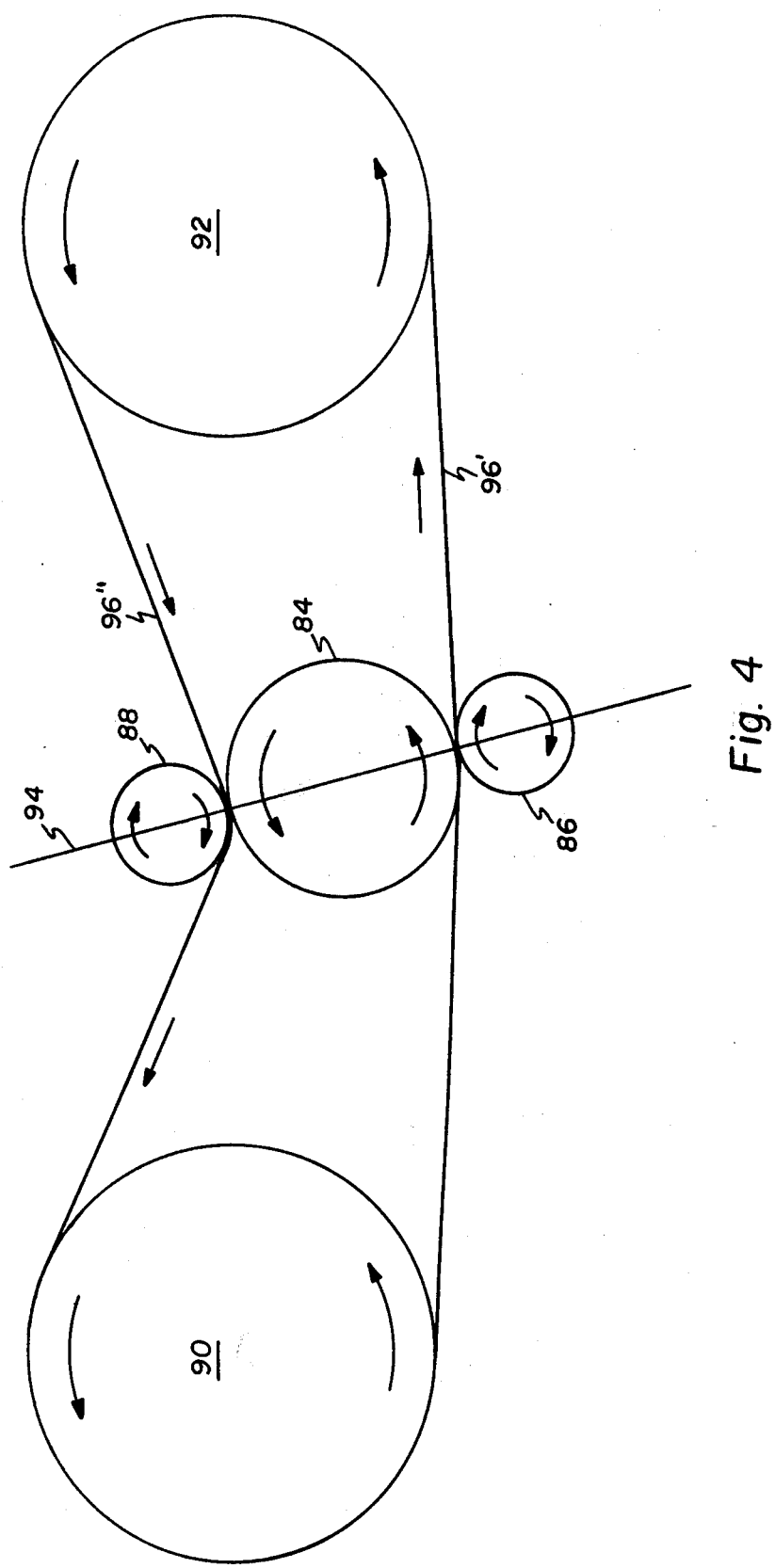
FIG. 4 schematically illustrates the tensioner of the invention on a moving loaded belt.

FIGS. 3 and 4 illustrate how the floating idler tensioner of the invention operates in practice. FIG. 3 shows a system comprising a belt 96, a center pulley 84, and tensioner pulleys 86 and 88 at rest or unloaded between a driven pulley 90 and a driving pulley 92. Note that pulleys 84, 86 and 88 of the idler all lie on an axis 94 corresponding to longitudinal axes 80 and 80' of FIGS. 1 and 2. In FIG. 3, belt 96 is pinched at its center because central pulley 84 is smaller in diameter than either of pulleys 90 or 92. Central pulley 84 must be smaller than at least the driven pulley 90 in order for the idler to function. This will be further discussed infra.

FIG. 4 shows the system of FIG. 3 in loaded operation. It will be readily seen that portion of the belt 96 driving driven pulley 90 from driving pulley 92, i.e., portion 96', is substantially taut whereas return portion 96" is slack. The invention pulls the slack portion 96" toward driving portion 96' so that the "purchase area", i.e., the area on pulleys 90 and 92 in frictional contact with belt 96 increases. The greater the amount of a pulley's circumference engaged with a belt, the greater is the purchase area. This is an important feature of the invention because this allows greater efficiency in rotational energy transmission by decreasing or eliminating energy transfer loss caused by belt slippage on the pulleys. In addition, maintaining a desirable amount of tension on belt 96 causes greater pressure or force between driving and driven pulleys and their belt. This also greatly adds to the reduction or entire elimination of belt slippage obtained by practicing the invention. It will be noted from FIG. 4 that the tensioner of invention "tilts" in loaded operation. The degree of tilt in a preferred embodiment is about 10°, but may be any workable amount. This tilt results from the change in tangent points in the driven pulley. Tangent points are the end points of the area of the belt making contact with a pulley.

As can be seen, the floating idler tensioner of the invention increases the purchase area a band makes with a driving or driven pulley or sprocket, maintains a preselected tension on the band, and is adjustable to change band tension while the band and pulleys or sprockets are in motion. It will be appreciated by those skilled in the art that the distance between driving and driven pulleys may be up to, or greater than, 100 feet in practicing the invention.

In addition, because the floating tensioner of the invention is adjustable so that a preselected belt tension is maintained, the tensioner may be set to release belt drive to a driven pulley by allowing the belt to slip on the driven pulley if the driven pulley offers too much turning resistance. Thus, the tensioner of the invention maximizes pulley to belt contact efficiency and at the same time acts as a safety release should the driven pulley bind.

The floating idler tensioner of the invention self adjusts in that it moves toward the driven pulley as the belt gradually stretches with time. When the tensioner gets close to the driven pulley, it can be manually adjusted by turning screws 60 and 62 to increase tension on the belt. This will move the tensioner back away from the driven pulley, and typically need only be done infrequently. Thus, the tension adjustment is maintained far longer than with non-floating prior art devices.

The rpm range over which the invention is useful is virtually unlimited. However, it will be appreciated by those of ordinary skill in the art that band strength and bearing construction as well as other mechanical or design factors will limit rpm ranges.

As shown in the preferred embodiment, central pulley 32 is grooved. However, the tensioning pulleys 66 and 68 could be grooved and central pulley 32 could be smooth. Normally, the central pulley is grooved, the same as driving and driven pulleys, because only one side of a belt is adapted to ride in a groove. The conventional "V" belt is an example of such a belt. The groove or grooves are solely necessary to act to keep the floating tensioner of the invention on the belt. Hence, what combination of grooves and circumferentially flat pulleys are selected will be purely a matter of choice to those skilled in the art. However, it should be understood that groove depth affects adjustability of the tensioner. Deeper grooves offer a wider range of adjustability than do shallower grooves.

The equilibrium position of the tensioner is reached when the force exerted on the tensioner by the portion of the belt between the tensioner and the driven pulley is exactly enough to resist the force exerted by the belt pushing the tensioner toward the driven pulley. This equilibrium is maintained as the belt stretches with time, because the tensioner will move toward the driven pulley a distance corresponding to the amount of belt stretch, and will "tilt" toward the driven pulley in accordance with its new tangent points.

The various features and advantages of the invention are thought to be clear from the foregoing description. However, various other features and advantages not specifically enumerated will undoubtedly occur to those versed in the art, as likewise will many variations and modifications of the embodiments illustrated herein, all of which may be achieved without departing from the spirit and scope of the invention as defined by the appended claims.

I claim:

1. A floating idler tensioner for a drivable band having a driving portion and a driven portion, said band engaging at least one driven wheel and one driving wheel, said tensioner being supportable solely by said band, said tensioner comprising:
   a housing having a longitudinal axis;
   central means for frictionally engaging said drivable band rotatably attached to said housing and having an axis of rotation perpendicular to said longitudinal axis;
   first rotatable and adjustable tension imposing means for frictionally engaging said drivable band on said driving portion of said band having an axis of rotation essentially perpendicular to said longitudinal axis and parallel to said axis of rotation of said central means; and
   second rotatable and adjustable tension imposing means for frictionally engaging said drivable band on said driven portion of said band having an axis of rotation essentially perpendicular to said longitudinal axis and parallel to said axis of rotation of said central means.

2. The invention of claim 1 wherein said first rotatable and adjustable tension imposing means comprises means for band tension adjusting when said band is moving.

3. The invention of claim 1 wherein said second rotatable and adjustable tension imposing means comprises means for adjusting band tension when said band is moving.

4. The invention of claim 1 wherein said band comprises a belt, said central rotatable means comprises a pulley and said first and second tension imposing means comprise wheels.

5. The invention of claim 1 wherein at least one of said first and second tension imposing means comprises a pulley.

6. The invention of claim 1 wherein said band comprises a chain and said central rotatable means comprises a sprocket wheel having teeth engagable with said chain.

7. The invention of claim 1 wherein said band comprises a belt and said central rotatable means comprises groove means for retaining said tensioner on said belt.

8. A self-adjusting floating idler tensioner for use on a movable band being driven by a driving wheel and driving a driven wheel, said tensioner comprising:
   means for supporting said tensioner solely with said movable band so that said tensioner floats on said band;
   means for initially setting the tension said tensioner applies to said band; and
   means for continually self-adjusting the tension of said band as applied by said tensioner to retain substantially said initial tension as said band gradually stretches with use.

9. The invention of claim 8 wherein said initial tension setting means comprises means for setting band tension as said band is moving.

* * * * *